United States Patent [19]

Scholz et al.

[11] Patent Number: 6,040,053

[45] Date of Patent: *Mar. 21, 2000

[54] COATING COMPOSITION HAVING ANTI-REFLECTIVE AND ANTI-FOGGING PROPERTIES

[75] Inventors: Matthew T. Scholz, Woodbury; George V. Tiers, St. Paul, both of Minn.

[73] Assignee: Minnesota Mining and Manufacturing Company, St. Paul, Minn.

[*] Notice: This patent is subject to a terminal disclaimer.

[21] Appl. No.: 09/033,323

[22] Filed: Mar. 2, 1998

Related U.S. Application Data

[63] Continuation of application No. 08/684,527, Jul. 19, 1996, Pat. No. 5,723,175.

[51] Int. Cl.⁷ .................................................. B32B 17/10
[52] U.S. Cl. ......................... 428/412; 428/429; 428/447; 428/451; 428/452
[58] Field of Search ............................ 428/429, 412, 428/447, 451, 452

[56] References Cited

U.S. PATENT DOCUMENTS

| | | | |
|---|---|---|---|
| 2,366,516 | 1/1945 | Geffcken et al. ................... | 427/165 |
| 2,559,629 | 7/1951 | Berry ................................. | 554/103 |
| 2,732,398 | 1/1956 | Brice et al. ........................ | 562/30 |
| 2,803,552 | 8/1957 | Stedman ............................ | 106/13 |
| 2,809,990 | 10/1957 | Brown ............................... | 562/556 |
| 3,022,178 | 2/1962 | Park et al. ......................... | 106/13 |
| 3,075,228 | 1/1963 | Elias ................................. | 15/104.93 |
| 3,212,909 | 10/1965 | Leigh ................................ | 106/13 |
| 3,301,701 | 1/1967 | Baker et al. ....................... | 428/331 |
| 3,816,184 | 6/1974 | Redmore et al. .................. | 148/250 |
| 3,819,522 | 6/1974 | Zmoda et al. ..................... | 510/182 |
| 3,826,127 | 7/1974 | Molina .............................. | 73/629 |
| 3,833,368 | 9/1974 | Land et al. ........................ | 430/220 |
| 3,864,132 | 2/1975 | Rasch et al. ...................... | 430/496 |
| 3,897,356 | 7/1975 | Paciluyko ......................... | 15/104.93 |
| 3,986,997 | 10/1976 | Clark ................................. | 524/300 |
| 4,190,321 | 2/1980 | Dorer et al. ...................... | 359/581 |
| 4,235,638 | 11/1980 | Beck et al. ........................ | 106/287.12 |
| 4,264,707 | 4/1981 | Uozumi et al. ................... | 430/275.1 |
| 4,271,210 | 6/1981 | Yoldas .............................. | 427/169 |
| 4,273,826 | 6/1981 | McCollister et al. ............. | 428/310.5 |
| 4,275,118 | 6/1981 | Baney et al. ...................... | 428/41.2 |
| 4,284,685 | 8/1981 | Olson et al. ...................... | 428/331 |
| 4,309,319 | 1/1982 | Vaughn, Jr. ....................... | 106/177.1 |
| 4,310,330 | 1/1982 | Funaki et al. ..................... | 8/506 |
| 4,340,276 | 7/1982 | Maffitt et al. .................... | 359/581 |
| 4,344,860 | 8/1982 | Pleuddemann .................... | 252/389.32 |
| 4,346,131 | 8/1982 | Yoldas .............................. | 428/34.7 |
| 4,370,255 | 1/1983 | Pleuddemann .................... | 252/389.22 |
| 4,374,158 | 2/1983 | Taniguchi et al. ................ | 427/536 |
| 4,409,285 | 10/1983 | Swerdlow ......................... | 428/332 |
| 4,446,171 | 5/1984 | Thomas ............................. | 427/160 |
| 4,467,073 | 8/1984 | Creasy .............................. | 525/127 |
| 4,478,909 | 10/1984 | Taniguchi et al. ................ | 428/331 |
| 4,505,997 | 3/1985 | Armand et al. ................... | 429/314 |
| 4,610,955 | 9/1986 | Chen et al. ....................... | 430/527 |
| 4,731,264 | 3/1988 | Lin et al. .......................... | 427/387 |
| 4,816,333 | 3/1989 | Lange et al. ...................... | 428/331 |
| 4,895,767 | 1/1990 | Mori et al. ........................ | 428/447 |
| 4,944,294 | 7/1990 | Borek et al. ...................... | 128/206.19 |
| 5,020,533 | 6/1991 | Hubbard et al. .................. | 128/206.23 |
| 5,021,091 | 6/1991 | Takarada et al. ................. | 106/287.16 |
| 5,021,308 | 6/1991 | Armand et al. ................... | 429/336 |
| 5,049,414 | 9/1991 | Kato .................................. | 427/164 |
| 5,100,503 | 3/1992 | Allman et al. .................... | 438/694 |
| 5,134,021 | 7/1992 | Hosono et al. .................... | 428/213 |
| 5,150,703 | 9/1992 | Hubbard et al. .................. | 128/206.12 |
| 5,204,219 | 4/1993 | Van Ooij et al. ................. | 430/272.1 |
| 5,242,887 | 9/1993 | Usui .................................. | 503/227 |
| 5,449,702 | 9/1995 | Tayama et al. ................... | 522/4 |
| 5,476,717 | 12/1995 | Floch ................................ | 428/421 |
| 5,523,649 | 6/1996 | Tong et al. ........................ | 313/479 |
| 5,585,186 | 12/1996 | Scholz et al. ..................... | 428/412 |
| 5,723,175 | 3/1998 | Scholz et al. ..................... | 427/161 |
| 5,753,373 | 5/1998 | Scholz et al. ..................... | 428/429 |

FOREIGN PATENT DOCUMENTS

| | | |
|---|---|---|
| 0 051 405 A1 | 5/1982 | European Pat. Off. . |
| 0 203 730 | 12/1986 | European Pat. Off. . |
| 0 372 756 | 6/1990 | European Pat. Off. . |
| 0 460 382 A2 | 12/1991 | European Pat. Off. . |
| 24 46 279 | 1/1976 | Germany . |
| 29 47 823 | 6/1980 | Germany . |
| 29 49 168 C2 | 7/1980 | Germany . |
| 58-126502 | 7/1983 | Japan . |
| 61-053038 | 3/1986 | Japan . |
| 62-129366 | 6/1987 | Japan . |
| 63-014141 | 1/1988 | Japan . |
| 63-179966 | 7/1988 | Japan . |
| 2022342 | 1/1990 | Japan . |
| 2022343 | 1/1990 | Japan . |
| 2022344 | 1/1990 | Japan . |
| 03101926 | 4/1991 | Japan . |
| 5-59023 | 3/1993 | Japan . |
| 5-59300 | 3/1993 | Japan . |
| WO 89/10106 | 11/1989 | WIPO . |
| WO 96/18691 | 6/1996 | WIPO . |
| WO 96/18918 | 6/1996 | WIPO . |
| WO 97/23571 | 7/1997 | WIPO . |

*Primary Examiner*—D. S. Nakarani
*Attorney, Agent, or Firm*—Robert W. Sprague; Jeffrey J. Hohenshell

[57] ABSTRACT

A coating composition which imparts anti-reflective and anti-fog properties to substrates coated therewith. The coating composition utilizes an inorganic metal oxide in combination with silane or a siloxane oligomer. The coating compositions are particularly useful in the manufacture of disposable surgical masks and face shields.

5 Claims, No Drawings

COATING COMPOSITION HAVING ANTI-REFLECTIVE AND ANTI-FOGGING PROPERTIES

This is a continuation of application Ser. No. 08/684,527 filed Jul. 19, 1996, now U.S. Pat. No. 5,723,175 which is a division of application Ser. No. 08/354,343, filed Dec. 12, 1994, now U.S. Pat. No. 5,585,186.

TECHNICAL FIELD

This invention relates generally to coating compositions and methods for producing optically clear articles with very low reflection and exceptional anti-fogging properties even under high humidity conditions. Such properties are desirable in articles such as face shields used for personal protection, ophthalmic lenses, architectural glazings, windows, automotive windshields and the like.

BACKGROUND ART

There are numerous instances where the value of optically clear articles would be enhanced if the tendency of the articles to cause glare or to be obscured by the formation of a fog on a surface of the article could be reduced. For example, protective eyewear (goggles, face shields, helmets, etc.), ophthalmic lenses, architectural glazings, decorative glass frames, motor vehicle windows and windshields may all reflect light in a manner that causes an annoying and disruptive glare. Use of such articles may also be detrimentally affected by the formation of a moisture vapor fog on a surface of the article.

Glare is the undesirable reflection of light from a surface upon which the light is incident. In general, glare may be reduced by increasing the amount of light transmitted by the article, thereby reducing the amount of light which is available for reflection. Alternatively, the article surface can be modified (e.g., roughened, embossed, etc.) to cause the light to be reflected from the article more randomly and, therefore, with less glare.

Coatings which significantly increase the percent transmission of light and provide articles having very low reflection ("anti-reflective coatings") are known in the art. For example, U.S. Pat. No. 4,816,333 to Lange et al. (also assigned to 3M) discloses anti-reflective coatings of silica particles. The coating solution contains colloidal silica particles and optionally a surfactant ("Triton™ X-100" and "Tergitol TMN-6") to improve the wettability of the coating solution. U.S. Pat. No. 4,374,158 (Taniguchi et al.) discloses an anti-reflective coating using a gas phase treatment technique. The coating may optionally contain additives as surface controlling agents, such as silicone type surfactants. Various other types of anti-reflective coatings are disclosed in U.S. Pat. Nos. 2,366,516; 3,301,701; 3,833,368; 4,190, 321, 4,271,210; 4,273,826; 4,346,131 and 4,409,285; by Cathro et al. in "Silica Low-Reflection Coatings for Collector Covers by a Dye-Coating Process," Solar Energy, Vol. 32, No. 5, pp. 573–579 (1984); and by J. D. Masso in "Evaluation of Scratch Resistant and Anti-reflective Coatings for Plastic Lenses," Proceedings of the 32nd Annual Technical Conference of the Society of Vacuum Coaters, Vol. 32, p. 237–240 (1989). None of these anti-reflective coatings produce a durable anti-fog coating.

In general, fog formation occurs under conditions of high humidity and high temperature or at interfacial boundaries where there is a large temperature and humidity difference. Coatings which reportedly reduce the tendency for surfaces to "fog up" (i.e., anti-fogging coatings) are known. For example, U.S. Pat. No. 4,235,638 to Beck et. al. discloses sulfonato-organosilanol compounds which are used for imparting hydrophilicity and anti-fogging properties to siliceous surfaces such as glass. U.S. Pat. No. 3,212,909 to Leigh, discloses the use of ammonium soap, such as alkyl ammonium carboxylates in admixture with a surface active agent which is a sulfated or sulfonated fatty material, to produce an anti-fogging composition. U.S. Pat. No. 3,075, 228 to Elias discloses the use of salts of sulfated alkyl aryloxypolyalkoxy alcohol, as well as alkylbenzene sulfonates, to produce an anti-fogging article useful in cleaning, and imparting anti-fog properties to various surfaces. U.S. Pat. No. 3,819,522 to Zmoda, discloses the use of surfactant combinations comprising derivatives of decyne diol as well as surfactant mixtures which include ethoxylated alkyl sulfates in an anti-fogging window cleaner surfactant mixture.

Japanese Patent Kokai No. Hei 6[1994]-41335 discloses a clouding and drip preventive composition comprising colloidal alumina, colloidal silica and an anionic surfactant.

U.S. Pat. No. 4,478,909 (Taniguchi et al.) discloses a cured anti-fogging coating film which comprises polyvinyl alcohol, a finely divided silica, and an organic silicon compound, the carbon/silicon weight ratio apparently being important to the film's reported anti-fogging properties. Various surfactants, including fluorine-containing surfactants, may be used to improve the surface smoothness of the coating.

Other anti-fog coatings incorporating surfactants are described in U.S. Pat. Nos. 2,803,552; 3,022,178 and 3,897, 356. "Anti-fog Antistat Eases Processing Problems," Modern Plastics, Oct. 1988, discusses antistat agents, including alkyl sulfonates, and anti-fog agents for use in plastic films. Furthermore, American Cyanamid Industrial Chemical Division markets "Aerosol™ OT Surface Active Agent" (dioctylsodium-sulfosuccinate), which is advertised as useful to prepare an anti-fog composition for direct application to glass.

None of the above-described coatings which reduce the tendency for an article to fog have anti-reflective properties. Furthermore, in general, the anti-fog compositions of the prior art rely on high solution concentrations (e.g., in excess of 0.2 percent, and typically in concentrations in excess of 5 percent by weight) of surfactant and other organic additives to provide an anti-fog effect. When used at such high concentrations, the surfactants and other organic additives would interfere with and significantly reduce the anti-reflective properties provided by porous coatings, such as metal oxides.

Face masks and shields which are described as having anti-fog and anti-glare properties are known. For example, the "SHIELDMATE" by IREMA U.S.A. Ltd. of Chicopee, M. A. is described in U.S. Pat. No. 4,944,294 (Borek). The hospital face mask is described as including a transparent plastic eye shield coated with any suitable anti-fogging, anti-glare silicone agent, such as a dimethylsiloxane polymer.

World Patent Application No. 89/10106 (Russell) discloses a surgical mask/face shield combination. The face shield is coated with an anti-fog coating, such as that described in U.S. Pat. No. 4,467,073. These coatings are made by combining, for example, polyvinylpyrrolidone, a surfactant, and a curable isocyanate functional prepolymer. Additionally Infection Control Products, Inc., markets the "AGAFAR™ Adjustable Flip-Up Face Shield" which is advertised as being anti-glare, anti-fog and anti-reflective.

However, none of these products utilize a porous coating and none display an increase in transmission of visible light through the coated article of more than 2 to 3 percent greater than the uncoated article. It is understood that an increase in percent transmission corresponds to a decrease in percent reflection, provided the sample is transparent (i.e., non-light-absorbing and not hazy). Accordingly, a need exists for a coating composition which will impart anti-fog properties to a substrate coated therewith while increasing the percent transmission, and correspondingly decreasing the percent reflection, of incident light through the substrate, such that the substrate is truly "anti-reflective."

SUMMARY OF THE INVENTION

The present invention provides coating compositions which impart both anti-reflection and anti-fog properties to substrates coated therewith. By "anti-reflective" it is meant that the percent transmission of a light transmissive substrate coated with the coating composition is increased by at least 3% over the uncoated substrate. The coating composition utilizes an inorganic metal oxide in combination with particular anionic silanes which are present in a concentration which imparts a durable anti-fog property to the coated substrate, yet does not destroy the anti-reflective properties provided by the porous metal oxide.

The present invention provides a coating composition comprising:

(a) a porous inorganic metal oxide;

(b) a silane, or a siloxane oligomer which is formed by the partial or complete hydrolysis and condensation of said silane, wherein said silane or siloxane oligomer comprises at least one hydrophilic anionic group selected from the group consisting of $-OSO_2O^-$, $-SO_2O^-$, $-CO_2^-$, $(-O)_2P(O)O^-$, $-P(O)(O^-)_2$, $-OP(O)(O^-)_2$, $-P(O^-)_2$ and $-OP(O')_2$; wherein the coating composition when coated on at least one side of a light transmissive substrate preferably:

1) exhibits a drop diameter of at least 4 mm when tested in accordance with the Wetting Test described herein; and 2) has a percent transmission at 550 nm which is at least 3 percent greater than that of the uncoated substrate.

The compositions may optionally contain a wetting agent (e.g. a lower alcohol, surfactant or both) and/or a polymeric binder that improves adhesion of the dried coating to the substrate.

Preferred coating compositions applied to at least one side of a light transmissive substrate increase the percent transmission of the substrate by at least 5 percent, and preferably by 10 percent, while resisting fogging even upon exposure to "steam", i.e., warm air saturated with water. The anti-fog property is shelf stable and deteriorates very slowly, if at all, when exposed to accelerated aging conditions, as described hereinafter. Ideally, in preferred embodiments, the coated articles have exceptional anti-fog properties while also having greater than 96 percent transmission of 550 nm light.

The compositions may be applied to a wide variety of substrates by a variety of coating methods. Accordingly, the invention provides protective eyewear, such as surgical masks and face shields, as well as ophthalmic lenses, windows and windshields which have anti-reflective and anti-fog properties.

The invention also relates to a method of imparting anti-reflection and anti-fogging properties to a substrate. The method comprises the steps of providing a substrate, preparing a coating composition having the formulation described above, applying the coating composition to the substrate, and drying the coating composition.

DETAILED DESCRIPTION OF THE PREFERRED EMBODIMENTS

Anti-reflection

The anti-reflective properties of the coatings of this invention are provided by a porous inorganic metal oxide network. More particularly, the coating compositions of the invention when coated on a substrate and dried provide a continuous and highly porous network of metal oxide particles. As used herein, the term "continuous" refers to a coating having no visible discontinuities or gaps. The term "network" (as used herein) refers to a porous, three-dimensional structure, preferably formed by an aggregation of colloidal particles linked together. The network is held together through particle/particle, particle/silane and/or coupling agent or particle/silane and/or coupling agent/particle bonds, providing a coating having integrity which does not flake off by simple flexing and/or use of the coated article.

The term "porous" refers to the presence of voids between the inorganic metal oxide particles created when the particles pack together. For single layer coatings, it is known that in order to maximize light transmission in air through an optically transparent substrate, and minimize reflection by the substrate, the refractive index of the coating should equal as closely as possible the square root of the refractive index of the substrate and the thickness of the coating should be one-fourth (¼) of the optical wavelength of the incident light. The voids in the coating provide a multiplicity of subwavelength interstices between the metal oxide particles where the index of refraction (IR) abruptly changes from that of air (IR=1) to that of the metal oxide particles (e.g., for silica IR=1.44). By adjusting the porosity, a coating having a calculated index of refraction (as shown in U.S. Pat. No. 4,816,333 (Lange, et al.) incorporated herein by reference) very close to the square root of the refractive index of the substrate can be created. By utilizing coatings having optimal indices of refraction, at coating thicknesses equal to approximately one-fourth the optical wavelength of the incident light, the percent transmission of light through the coated substrate is maximized and reflection is minimized.

The voids in the coating are present substantially throughout; however, the coating may vary in density, e.g., the coating may become gradually more porous moving away from the substrate producing a gradient density. Such a gradient density enhances the anti-reflective property of the coating. Preferably, the network has a porosity of about 25 to 45 volume percent, more preferably about 30 to 40 volume percent, when dried. Porosity may be calculated from the refractive index of the coating according to published procedures such as in W. L. Bragg, A. B. Pippard, *Acta Crystallographica*, volume 6, page 865 (1953) incorporated herein by reference. When the metal oxide is silicon dioxide, this porosity provides a coating having an index of refraction of 1.2 to 1.4, preferably 1.25 to 1.36, which is approximately equal to the square root of the refractive indices of polyester, polycarbonate, or polymethyl methacrylate substrates. For example, a porous silica coating having a refractive index of 1.25 to 1.36 is capable of providing a highly anti-reflective surface when coated on a polyethylene terephthalate substrate (IR=1.64) at a thickness of 1000–1200 Å.

The metal oxide component of the present invention is preferably silica (essentially silicon dioxide with or without other additives or impurities) but may alternatively be aluminum oxide, tin oxide, titanium oxide, antimony oxide, zirconium oxide, as well as mixtures and combinations thereof. The metal oxide particles should be less than about 200 nm in diameter in order to provide effective anti-reflective properties. Preferably the average particle diameter is less than 70 nm, more preferably less than 20 nm, and most preferably between about 4 and 8 nm. Although the particles are preferably spherical, other shapes are possible including irregular and fibrous shapes. The metal oxide concentration is preferably from about 0.1 to 15 percent by weight of the coating solution, more preferably from about 0.5 to 5 percent by weight. Above about 15 percent by weight the coating solution becomes difficult to apply in the desired thickness range and below about 0.1 percent by weight, excessive time periods are required for the coating to dry after application to the substrate. The term "solution" as used herein includes dispersions or suspensions of finely divided inorganic metal oxide particles in a liquid medium.

The metal oxide is most conveniently coated on the substrate as a colloidal dispersion (referred to herein as a "sol") which comprises finely divided solid inorganic metal oxide particles in an aqueous or an organic liquid. The sol may be acid or base stabilized. Sodium hydroxide base stabilized sols having a pH of 9 to 11 are most preferred and include "NALCO 1115" and "NALCO 1130," commercially available from NALCO Chemical Co., "Remasol SP30," commercially available from Remet Corp., and "LUDOX SM," commercially available from E. I. Du Pont de Nemours Co., Inc.

Anti-fog

The coating compositions of the present invention provide anti-fog properties, in addition to anti-reflection, to substrates coated therewith. Coatings are considered anti-fogging if a coated substrate resists the formation of small, condensed water droplets in sufficient density to significantly reduce the transparency of the coated substrate such that it cannot be adequately seen through, after exposure to repeated human breathing directly on the article and/or after holding the article above a "steam" jet. A coating composition may still be regarded as anti-fogging even though a uniform water film or a small number of large water droplets forms on the coated substrate so long as the transparency of the coated substrate is not significantly reduced such that it cannot be readily seen through. In many instances, a film of water that does not significantly reduce the transparency of the substrate will remain after the substrate has been exposed to a "steam" jet.

The compositions of the present invention derive their anti-fogging property by incorporation of particular anionic silanes or combinations of such silanes. The term silane as used herein describes organofunctional silicon containing compounds capable of hydrolyzing to organosilanol with subsequent condensation to organofunctional siloxane oligomers. The anionic property of the silanes of the present invention is an important one. We have found that non-ionic hydrophilic silanes (such as "A-1230" available from Union Carbide Corporation, Danbury, Conn.) do not produce a durable anti-fog coating. Similarly, cationic silanes based on quaternary amines have not proven useful at concentrations which do not interrupt the steric stabilization of base stabilized sols, i.e. do not result in precipitation of the sol, (an obvious upper limit).

The silane compounds useful in the solutions and compositions of the present invention have the following general structure:

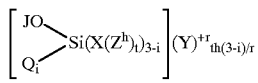

wherein:
Q is selected from the group consisting of hydroxyl, alkyl groups containing from 1 to about 4 carbon atoms, and alkoxy groups containing from 1 to about 4 carbon atoms;

J is selected from cations derived from the group consisting of hydrogen, alkali metals (e.g., sodium, potassium and litium) and organic cations of strong bases having an average molecular weight of less than about 150 and a pKa of greater than about 11;

X is an organic linking group;

Z is selected from the group consisting of —$OSO_2O^-$, —$SO_2O^-$, —$CO_2^-$, (—O)$_2$P(O)O$^-$, —P(O)(O$^-$)$_2$, —OP(O)(O$^-$)$_2$, —P(O$^-$)$_2$ and —OP(O$^-$)$_2$;

Y is selected from cations derived from the group consisting of hydrogen, alkali metals, alkali earth metals, organic cations of weak bases having an average molecular weight of less than about 200 and a pKa of about 8 to 11 (e.g., HN$^+$(CH$_2$CH$_2$CH$_2$OH)$_3$ and H$_2$N$^+$(CH$_2$CH$_2$OH)$_2$), organic cations of strong bases having an average molecular weight of less than about 150 and a pKa of greater than about 11, substituted and unsubstituted guanidines, and quaternary ammonium cations (e.g.N$^+$(CH$_3$)$_4$, N$^+$(CH$_2$CH$_3$)$_4$ and N$^+$H$_4$); provided that J is hydrogen when Y is selected from cations derived from hydrogen, alkaline earth metals and said organic weak organic bases;

r is equal to the valence of Y and is 1 to 3;

h is 1 or 2;

i is 1 or 2; and t is 1 to 3.

Preferably Z is sulfonate (—$SO_2O^-$) or phosphonate (—P(O)(O$^-$)$_2$) or carboxylate (—$CO_2^-$), more preferably sulfonate and phosphonate, and the preferred anionic silane is an organosilanol, such as the sulfonato-organosilanols disclosed in U.S. Pat. No. 4,235,638 to Beck, incorporated herein by reference. Alternatively, the anionic silane may be one of those disclosed in U.S. Pat. Nos. 3,816,184; 4,344,860; or 4,370,255; all of which are incorporated herein by reference. The organic linking group X, is preferably selected from alkylene groups, cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxa-thia backbone substitution, divalent hydrocarbon groups having dioxa-thia backbone substitution, arylene groups, arylalkylene groups, alkylarylene groups, and alkylarylene groups, all of which groups may be substituted by N, O and/or S atoms and all of which X groups comprise from about 1 to 20 carbon atoms, preferably from about 1 to 6 carbon atoms. Most preferably X is selected from alkylene groups, hydroxy-substituted alkylene groups and hydroxy-substituted mono-oxa alkylene groups.

Preferably J=Y and is selected from H, an alkali metal, or ammonium. Most preferably J=Y and is sodium or N$^+$H$_4$.

In order to ensure optimum hydrophilicity and maximize the durability of the anti-fog property, the preferred anionic organosilanol preferably has a relatively high percentage of oxygen on a weight percentage basis. Preferably, the weight percent oxygen is at least about 30%, more preferably at least about 40%, and most preferably in the range of about 45 to 55%. In general, the weight percent silicon in these compounds is no greater than about 15%. Each of these percentages is based on the weight of the compound in the water-free acid form. Aqueous or hydroalcoholic solutions of the organosilanol-sulfonic acids (i.e. Z is —$SO_3^-$ and Y is hydrogen) are acidic generally having a pH of less than about 5 while the organo-silanolate-sulfonate salts are basic and generally have a pH of greater than about 9.0. In order to prevent destabilization of the preferred base stabilized metal oxide sols the organo-silanolate-sulfonate salt form is preferred. It is understood that cations exchange readily with one another such that base cations of metal oxide sols will exchange with those of hydrophilic silanes and surfactants.

The anionic organosilanol may be applied as part of the metal oxide coating composition or may be applied as an "overcoat", i.e. can be applied as a separate coating solution applied over a previously deposited metal oxide coating. Preferably, the anionic organo-silanol is added directly to the metal oxide sol coating composition to simplify the coating process and to minimize any risk of scratching the metal oxide layer.

The preferred anionic organosilanols are most conveniently applied from an aqueous or hydroalcoholic solution and therefore may be partially or completely hydrolyzed to the silanol/silanolate form and may include oligomeric siloxane forms of the anionic organosilanol. The level of organosilanol must be kept relatively low with respect to the metal oxide concentration in order to prevent reduction in the anti-reflective property. The anti-reflective property may be decreased by one or both of two means. Firstly, if too much organosilanol is added the porosity (void volume) of the coating decreases, thereby increasing the refractive index of the coating beyond that desired for maximum transmission of light. Secondly, the refractive index of the silane itself might influence the refractive index of the coating if the amount of silane becomes excessive. In general, the highest level of anionic silane which will not adversely affect the anti-reflective property or coating quality is preferred. The anionic silanes are preferably added to the coating composition at a concentration of about 5 to 50% by weight of the metal oxide. More preferably the anionic silanes are added to the coating composition at a concentration of about 10 to 30% by weight of the metal oxide, in order to preserve the anti-reflective properties of the coating. Optionally, the dried coating may be rinsed or steeped in water to remove excess silane or siloxane oligomer deposited in, but not bonded to, the porous metal oxide coating.

Other Additives

Multiple silanes of the present invention may be used in combination or may be combined with coupling agents. As used herein the term "coupling agent" refers to compounds having at least two reactive functionalities. One reactive functionality is capable of covalently bonding to a metal oxide surface or to the hydrophilic anionic silane(s) (i.e., reacting with an M—OH group where M=Si, Ti, Zr, Al, Sn, or Sb). A second reactive functionality is capable of reacting with an organic functional group. For example, the anionic silanes of the present invention can be combined with a coupling agent which is capable of reacting with specific functional groups on the surface of the article to be coated, thereby promoting adhesion of the coating to the substrate and producing an exceptionally adherent anti-fog anti-reflective coating. Some coupling agents may be capable of covalently bonding certain surfactants (described hereinbelow) to the metal oxide. In this case the coupling agent has one reactive functionality capable of covalently bonding to the metal oxide and a second capable of covalently bonding to the surfactant. For example, reactive functionalities such as amino, hydroxyl and mercaptan groups present on one compound or surface can react with complementary reactive functionalities, such as oxirane, chloro- or bromo-alkyl or isocyanato groups, present on the other compound or surface. More than one coupling agent may be used. For example, two types of coupling agents which are capable of covalently bonding to each other may be employed where one coupling agent is capable of covalently bonding to the metal oxide and the other is capable of covalently bonding to the surfactant.

Suitable coupling agents include silane coupling agents with the following formula:

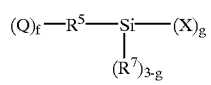

wherein:

$R^5$ is a substituted or unsubstituted divalent hydrocarbon bridging group of about 1 to 20 carbon atoms, optionally including in the backbone 1 to 5 moieties selected from the group consisting of —O—, —C(O)—, —S—, —$SO_2$— and —$NR^6$— groups, and optionally substituted on the backbone by —OH, —SH, or —$NR^6_2$, wherein $R^6$ is hydrogen, acetyl, or a hydrocarbon group of 1 to 6 carbon atoms;

X is —$OR^8$ where $R^8$ is an alkyl, aryl, heteroaryl or aralkyl group of 1 to 8 carbon atoms, preferably methyl or ethyl; or —N=$C(R^9)_2$, wherein $R^9$ is independently an alkyl, aryl or aralkyl group of 1 to 8 carbon atoms;

$R^7$ is independently an alkyl, aryl, aralkyl or alkoxy group of 1 to 8 carbon atoms optionally substituted in available positions by oxygen, nitrogen and/or sulfur atoms;

f is 0, 1, or 2;

g is 2 or 3; and

Q is a reactive functional group capable of reacting with complementary functionalities on the surface of the substrate or the surfactant. Examples of Q include amino; hydroxyl; mercaptan; oxirane; chloro-, iodo-, and bromo-alkyl; aziridine; cyclic carboxylic anhydride; acrylate; methacrylate; acrylamide, azide, and isocyanato groups.

It should be understood that when present in the coating compositions of the invention (particularly with base stabilized sols) the coupling agents will tend to hydrolyze, such that one or more of the "X" or "$OR^2$" groups will be converted to a silanol or silanolate.

Preferred silanes have the structure:

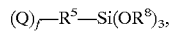

wherein Q is preferably a primary or secondary epoxy or amino group and $R^5$ and $R^8$ are as described above.

Additional information on ambifunctional silane coupling agents may be found in European Patent Application No. 0,372,756 A2, incorporated herein by reference. Alternatively the coupling agent can be a titanate or zirconate compound, such as a "Tyzor™ Titanate", commercially available from Du Pont.

The amount of coupling agent included in the coating composition should be limited in order to prevent destruction of the anti-reflective or anti-fog properties of the coating. The optimal amount of coupling agent is easily determined experimentally and is dependent on the coupling agent's identity, molecular weight and refractive index. The coupling agent(s), when present, are typically added to the composition at levels of 0.1 to 20 percent by weight of the metal oxide concentration, and more preferably about 1 to 10 percent by weight of the metal oxide. Tetraalkoxy coupling agents, such as tetraethylorthosilicate (TEOS) and oligomeric forms such as alkyl polysilicates (e.g. poly (diethoxy siloxane)), may also be useful to improve binding between metal oxide particles.

In order to coat the silanes of the present invention uniformly onto a hydrophobic substrate from an aqueous system it is desirable to increase the surface energy of the substrate and/or reduce the surface tension of the coating solution. The surface energy may be increased by oxidizing the substrate surface prior to coating using corona discharge or flame treatment methods. These methods may also improve adhesion of the coating to the substrate. Other methods capable of increasing the surface energy of the article include the use of primers such as thin coatings of polyvinylidene chloride (PVDC). Alternatively, the surface tension of the coating composition may be decreased by addition of lower alcohols ($C_1$ to $C_8$). In some instances, however, in order to ensure uniform coating of the article from an aqueous or hydroalcoholic solution, it may be beneficial to add a wetting agent, which is typically a surfactant. The term "surfactant" as used herein describes molecules comprising hydrophilic (polar) and hydrophobic (non-polar) regions on the same molecule which are sizable enough to be capable of reducing the surface tension of the coating solution. In addition, the preferred surfactants described hereinbelow are capable by themselves of providing a coating which imparts anti-fog properties to substrates or articles coated therewith. Preferred surfactants are described in commonly assigned copending United States patent application, Attorney's Docket number 49053USA1D filed upon the same date as this application, incorporated herein by reference. Certain of these surfactants comprise multiple hydrophilic and or hydrophobic regions on the same molecule.

A particularly useful surfactant comprises at least one hydrophilic anionic group. The anionic group may be —$OSO_2O^-$, —$SO_2O^-$, —$CO_2^-$, (—O)$_2$P(O)O$^-$, —OP(O)(O$^-$)$_2$, —P(O)(O$^-$)$_2$, —P(O$^-$)$_2$, —OP(O$^-$)$_2$, (—$SO_2$)$_2$N$^-$, —$SO_2$N(R)$^-$, (—$SO_2$)$_2$C$^-$H or —N$^+$(R)$_2$(CH$_2$)$_x$L', wherein R is hydrogen, an alkyl group which is unsubstituted or substituted with atoms independently selected from the group consisting of oxygen, nitrogen and sulfur, or an alkylene carboxyl group, which alkyl or alkylene group comprises about 1 to 10 carbon atoms; and x is 1 to 4; and L' is selected from the group consisting of —$OSO_2O^-$, —$SO_2O^-$, (—O)$_2$P(O)O$^-$, —OP(O)(O$^-$)$_2$, —P(O)(O$^-$)$_2$, and —$CO^-_2$. Each anionic group is associated with at least one cation such that the ratio of total anionic charge of the surfactant molecule to the total cationic charge of the surfactant molecule equals 1, making the net charge of the surfactant molecule neutral. The cation(s) are selected from the group consisting of hydrogen, sodium, potassium, lithium, ammonium, calcium, magnesium, aluminum, strontium, and R"A groups, wherein R" is R or R', and wherein R is hydrogen or an alkyl or cycloalkyl group of about 1 to 10 carbon atoms, and R' is covalently bonded to the surfactant molecule and is an alkyl bridging group of 1 to 10 carbon atoms, and A is selected from N$^+$R$_3$; a guanidinium ion optionally substituted with oxygen, nitrogen or sulfur atoms; or N$^+$B wherein B comprises 3 to 7 atoms selected from the group consisting of carbon, nitrogen, sulfur and oxygen atoms which complete the nitrogen containing heterocyclic ring; and wherein any R or R' group may be unsubstituted or substituted with oxygen, nitrogen or sulfur atoms. Of course, cations having a charge greater than one may be associated with more than one anion, e.g., —(SO$_4$)$_2$Ca or —(SO$_3$)$_2$Mg. The anionic group may be the sole hydrophilic group or may be covalently bound to other hydrophilic groups such as ester, thio-ester, ether, amide, urea, urethane, hydroxyl, and amine groups and polymers comprising these groups and having molecular weights less than about 5,000, and preferably less than about 2,000 (e.g., an anionic derivative of a polyethoxylated surfactant).

Useful anionic surfactants having a carboxylate group as the hydrophilic group further comprise an additional polar substituent capable of stabilizing the ionic form of the surfactant. Preferably, the additional polar substituent is no further than four atoms removed from the carbon of the carboxylate group. The added polar substituent is preferably an ether, amide, alcohol, carboxyl, ester, urea or urethane group.

Useful anionic surfactants of the type described above comprise at least one hydrophobic group which is a hydrocarbon chain comprising at least four carbon atoms, or a perfluorinated group comprising at least three carbon atoms. Surfactants containing a perfluorinated group preferably include a perfluorinated radical group of at least six carbons, more preferably at least eight carbon atoms. Surfactants which do not include a perfluorinated group preferably have a hydrocarbon chain of at least eight, and more preferably, at least twelve carbon atoms.

In order to be immobilized on the substrate at room temperature, preferably the surfactant also possesses at least one of the following characteristics.

1. The surfactant has a melting point greater than room temperature, i.e., greater than about 20° C., preferably greater than about 30° C., and most preferably greater than 40° C.

2. The surfactant is relatively insoluble in water. Preferably the surfactant has a solubility in water of less than about 10 percent by weight, more preferably less than about 1 percent by weight and most preferably less than about 0.1 percent by weight, at 23° C. Relatively insoluble surfactants are preferred since they are less likely to rehydrate, dissolve, and reorient, even under high humidity conditions.

3. The surfactant is capable of being covalently bound to metal oxide. The surfactant may itself react with the metal oxide, or may be chemically bound to the metal oxide through the use of a coupling agent, as described in further detail hereinbelow.

Surfactant Chemistry

The anionic surfactants useful in the practice of this invention have the following general structure:

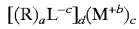

wherein:
R is a perfluorinated alkyl or cycloalkyl group of about 3 to 18 carbon atoms; a polyethoxylated perfluoroalkyl or perfluorocycloalkyl substituted alcohol comprising about 3 to 18 perfluorinated carbon atoms and about 0 to 30 non-fluorinated carbon atoms; a perfluoroalkyl substituted alkyl or alkenyl group of about 3 to 18 perfluorinated atoms and about 0 to 30 non-fluorinated carbon atoms, which alkyl or alkenyl group optionally comprises oxygen, nitrogen or sulfur atoms within or substituted upon the alkyl or alkenyl chain; an alkyl or alkenyl group (straight or branched chain) of about 4 to 36 carbon atoms, which alkyl or alkenyl group optionally comprises oxygen, nitrogen or sulfur atoms within or substituted upon the alkyl or alkenyl chain; an aralkyl group of about 7 to 36 carbon atoms, which aralkyl group is optionally independently substituted in available positions by oxygen, nitrogen or sulfur atoms; or a polyethoxylated or polypropoxylated alkyl or aralkyl group which alkyl or aralkyl group comprises about 7 to 36 carbon atoms;

L is a sulfate (—OSO$_2$O$^-$), sulfonate (—SO$_2$O$^-$), phosphate ((—O)$_2$P(O)O$^-$ or —OP(O)(O$^-$)$_2$), phosphonate (—P(O)(O$^-$)$_2$), sulfonimide ((—SO$_2$)$_2$N$^-$), sulfonamide (—SO$_2$N(R')$^-$), carboxylate (—CO$_2^-$), phosphonite (—P(O$^-$)$_2$), phosphite (—OP(O$^-$)$_2$), or disulfonylmethide ((—SO$_2$)$_2$C$^-$H) group. Amphoteric alkyl forms of the above groups are also useful, including groups having the formula —N$^+$(R''')$_2$(CH$_2$)$_x$L', wherein R''' is hydrogen or an alkyl or alkylene group optionally substituted with nitrogen, oxygen or sulfur atoms; or an alkylene carboxyl group, which alkyl or alkylene carboxyl group comprises about 1 to 10 carbon atoms; x=1 to 4; and L' is —OSO$_2$O$^-$, —SO$_2$O$^-$, (—O)$_2$P(O)O$^-$, —OP(O)(O$^-$)$_2$, —P(O)(O$^-$)$_2$, —CO$^-_2$, —P(O$^-$)$_2$, or —OP(O$^-$)$_2$; provided that when L is a carboxylate, R further comprises an additional polar heteroatom or substituent no further than four, and preferably no further than three, atoms removed from the carboxylate group wherein said polar substituent is an ether, amide, alcohol, carboxyl, ester, thioester, urea, or urethane group, or combinations thereof including oligomers comprising these polar groups;

M is hydrogen (H$^+$), sodium (Na$^+$), potassium (K$^+$), lithium (Li$^+$), ammonium (NH$_4^+$), calcium (Ca$^{+2}$), magnesium (Mg$^{+2}$), strontium (Sr$^{+2}$), aluminum (Al$^{+3}$) or R"A$^+$, wherein R" is R or R', wherein R is hydrogen or an alkyl or cycloalkyl group of about 1 to 10 carbon atoms and R' is covalently bonded to the surfactant molecule and is an alkyl bridging group of about 1 to 10 carbon atoms, and A$^+$ is selected from the group consisting of N$^+$R$_3$ (e.g., N$^+$(CH$_3$)$_4$, HN$^+$(CH$_2$CH$_2$OH)$_3$, H$_2$N(CH$_2$CH$_2$OH)$_2$); a guanidinium ion optionally substituted with oxygen, nitrogen or sulfur atoms; or a heterocyclic cation of the formula N$^+$B wherein B comprises 3 to 7 atoms selected from the group consisting of carbon, nitrogen, sulfur and oxygen atoms which complete the nitrogen containing heterocyclic ring; and wherein any R or R' group may be substituted in available positions with oxygen, nitrogen or sulfur atoms;

a and c are independently 1 or 2;

b and d are independently 1, 2 or 3; and e is equal to (c times d)/b, or O in the case of amphoteric surfactants.

When R is a polyethoxylated or polypropoxylated substituent or a copolymer of ethylene oxide and propylene oxide, wherein these polymeric subunits are preferably present in amounts of 1 to 100 moles, preferably about 1 to 20 moles per mole of surfactant.

The following anionic surfactant classes and anionic surfactants are particularly useful individually or in combination in the practice of the present invention:

1. Perfluoroaliphatic anionic salts

Surfactants within this class are of the general formula described above wherein:

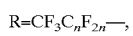
R=CF$_3$C$_n$F$_{2n}$—, and wherein n is about 2 to 17, preferably about 3 to 11.

Preferred surfactants within this class include the lithium, sodium and potassium salts of anionic perfluoroaliphatic-radical-containing compounds. Some particularly preferred lithium salts include the following:

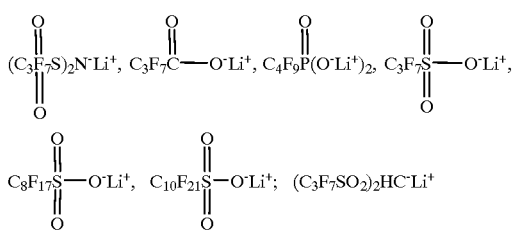

Useful lithium salts are made following techniques disclosed in, for example, U.S. Pat. No. 2,732,398 (Brice et al.) and U.S. Pat. No. 2,809,990 (Brown), both incorporated herein by reference. Examples of commercially available lithium salts of anionic perfluoroaliphatic radical containing compounds include "Fluorad™ FC-122," "Fluorad™ FC-123" and "Fluorad™ FC-124 Fluorochemical Surfactants," from 3M Company, St. Paul, Minn.

Preferred potassium salts include:

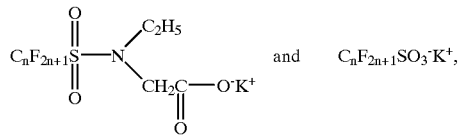

wherein n is about 3 to 18, as well as mixtures of these salts.

Useful potassium salts are made by following techniques disclosed in, for example, U.S. Pat. No. 2,809,990 (Brown). Examples of commercially available potassium salts include "Fluorad™ FC-127," "Fluorad™ FC-129" and "Fluorad™ FC-95 Fluorochemical Surfactant," from 3M. A useful ammonium salt is commercially available as "Fluorad FC-120 Fluorochemical Surfactant" from 3M.

2. Perfluorinated radical substituted aliphatic anionic salts

Surfactants within this class are of the general formula described above, wherein:

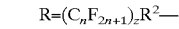
R=(C$_n$F$_{2n+1}$)$_z$R$^2$— and wherein:

n is about 2 to 36, preferably 6 to 12;

R$^2$ is a branched or straight chain alkylene or aralkylene of about 2 to 36 carbon atoms, preferably 2 to 22 carbon atoms, optionally independently substituted in available positions with oxygen, nitrogen or sulfur atoms, which R$^2$ group is selected such that R comprises at least 7 carbon atoms; and z is about 1 to 3, preferably about 1 or 2.

Examples of commercially available salts of this class include "Zonyl™ FSA Fluorosurfactant" (F(CF$_2$CF$_2$)$_{3-8}$CH$_2$CH$_2$SCH$_2$CH$_2$CO$_2^-$Li$^+$) and "Zonyl™ FSE Fluorosurfactant" (a mixture of F(CF$_2$CF$_2$)$_{3-8}$CH$_2$CH$_2$OP(O)(O$^-$NH$_4^+$)$_2$ and [F(CF$_2$CF$_2$)$_{3-8}$CH$_2$CH$_2$O]$_2$P(O) (O$^-$NH$_4^+$), from E.I. Du Pont de Nemours and Co.

3. Straight or branched chain aliphatic sulfates and sulfonates

Surfactants within this class are of the general formula described above, wherein:

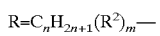
R=C$_n$H$_{2n+1}$(R$^2$)$_m$— and wherein:

n is about 4 to 36,

R² is a branched or straight chain alkyl or aralkyl of about 1 to 36 carbon atoms, preferably 1 to 22 carbon atoms, optionally independently substituted in available positions with oxygen, nitrogen or sulfur atoms;

m is 0 or 1, and

L is $SO_3^-$ or $SO_4^-$.

Examples of commercially available surfactants of this class include sodium dodecyl sulfate and sulfonates such as "Mackam™ CS"

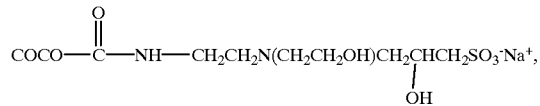

where "coco" means a mixture of alkyl chain lengths derived from coconut oil fatty acid residues, "Mackam™ CBS-50 Amphoteric" from The McIntyre Group Ltd., and "Hostastat HS-1" ($C_{10\text{-}18}H_{21\text{-}39}SO_3^-Na^+$), from Hoechst Celanese Corp.

4. Sulfates of polyethoxylated derivatives of straight or branched chain aliphatic alcohols and carboxylic acids Surfactants within this class are of the general formula described above, wherein:

$R=C_nH_{2n+1}(CO)_pO(CH_2CH_2O)_yCH_2CH_2$—, and wherein:

n is about 4–36, p is 0 or 1 and y is about 1–100, preferably 1–20; and wherein

L is $SO_4^-$.

Examples of commercially available surfactants of this class include "Steol CA-460" ($C_{12}H_{25}O(CH_2CH_2O)_{12}SO_3^-Na^+$), from Stepan Co.

5. Alkylbenzene or alkylnaphthalene sulfonates and sulfates

Surfactants within this class are of the general formula described above, wherein:

$R=(C_nOH_{2n+1})_qC_6H_{5-q}$— or $(C_nH_{2n+1})_qC_{10}H_{7-q}$— and wherein:

n is about 4 to 36, preferably 8 to 22, q is 1–3, preferably 1 or 2, and

L is $SO_3^-$ or $SO_4^-$.

Examples of commercially available surfactants of this class include "Rhodocal™ DS-10" (sodium laurylbenzene sulfonate) from Rhone-Poulenc Co., "Polystep™ A-16" ($C_{12}H_{23}$—$C_6H_6$—$SO_3^-Na^+$) and "Polystep™ A-15," from Stepan Co., and "Poly-Tergent™ 2EP" from Olin Corp.

6. Ethoxylated and polyethoxylated alkyl and aralkyl alcohol carboxylates

Surfactants within this class are of the general formula described above, wherein:

$R=(C_nH_{2n+1})_q(C_6H_{5-q})_mO(CH_2CH_2O)_yCH_2$—, and wherein:

n is about 4 to 36, preferably 8 to 22, m is 0 or 1, q is 1 or 2, preferably 1, and y is about 1 to 100, preferably 1–20; and wherein L is $CO_2^-$ Examples of commercially available surfactants of this class include "Sandopan LS-24 Carboxylated Surfactant" ($C_{12}H_{25}O(CH_2CH_2O)_{12}CH_2COO^-Na^+$), "Sandopan L8-HC Carboxylated Surfactant" and "Sandopan LA-8 Carboxylated Surfactant" ($C_{12}H_{25}O(CH_2CH_2O)_4CH_2COO^-Na^+$), from Sandoz Chemicals, Corp.

7. Glycinates

Surfactants within this class of the general formula described above, wherein:

$R=R^2$—$C(O)N(R^3)CH_2$— and wherein:

R² is a branched or straight chain alkyl of about 4 to 36 carbon atoms, preferably 8 to 22 carbon atoms, or an aralkyl of about 7 to 36 carbon atoms, preferably 12 to 22 carbon atoms, which alkyl or aralkyl group is optionally independently substituted in available positions with oxygen, nitrogen or sulfur atoms; and R³ is hydrogen or an alkyl group of about 1 to 10 carbon atoms which may be optionally independently substituted in available positions by oxygen, nitrogen or sulfur atoms;

and wherein L is $CO_2^-$.

Examples of preferred surfactants within this class are alkyl sarcosinates and alkyl glycinates. Examples of commercially available surfactants of this class include "Hampshire™ C-30", (coco-$C(O)N(CH_3)CH_2COO^-Na^+$) from Hampshire™ Chemical Co., and "Mackam™ Amphoteric" (dihydroxyethyl tallow glycinate) from the McIntyre Group, Ltd.

8. Sulfosuccinates

Surfactants within this class are of the general formula described above, wherein:

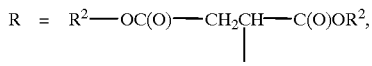

and wherein:

R² is a branched or straight chain alkyl group of about 4 to 36 carbon atoms, preferably 8 to 22 carbon atoms, or an aralkyl of about 7 to 36 carbon atoms, preferably 12 to 22 carbon atoms, which alkyl or aralkyl group may be independently substituted in available positions by oxygen, nitrogen and/or sulfur atoms; and L is $SO_3^-$.

An example of a preferred surfactant of this class is dialkyl sulfosuccinate. Examples of commercially available surfactants of this class include "Aerosol™ OT Surface Active Agent" ($C_8H_{17}OC(O)$—$CH(SO_3^-Na+)CH_2C(O)O$—$C_8H_{17}$) and "Aerosol™ TR Surface Active Agent" ($C_{13}H_{27}$—$OC(O)$—$CH$ $(SO_3^-Na^+)CH_2C(O)O$—$C_{13}H_{27}$) from Cytec Industries.

9. Isethionate Derivatives

Surfactants within this class are of the general formula described above, wherein:

$R=R^2$—$C(O)OCH_2CH_2$— and wherein R² is a branched or straight chain alkyl group of about 4 to 36 carbon atoms, preferably 8 to 22 carbon atoms, or an aralkyl group of about 7 to 36 carbon atoms, preferably 12 to 22 carbon atoms, which alkyl or aralkyl group is optionally independently substituted in available positions with oxygen, nitrogen or sulfur atoms; and L is SO$_3^-$ Examples of commercially available surfactants of this class include "Igepon™ AC-78" (coconut acid ester of sodium isethionate), from GAF Corp., New York, N.Y.

10. N-acyltaurine Derivatives

Surfactants within this class are of the general formula described above wherein:

R=R$^2$—C(O)—N(R$^3$)CH$_2$CH$_2$— and wherein R$^2$ is a branched or straight chain alkyl group of about 4 to 36 carbon atoms, preferably 8 to 22 carbon atoms, or an aralkyl group of about 7 to 36 carbon atoms, preferably 12 to 22 carbon atoms, which alkyl or aralkyl group is optionally independently substituted in available positions with oxygen, nitrogen or sulfur atoms;

R$^3$ is hydrogen or an alkyl group of about 1 to 10 carbon atoms which may be optionally independently substituted in available positions by oxygen, nitrogen or sulfur atoms; and

L=SO$_3^-$

Examples of commercially available surfactants of this class include "Igepon™ T-77" (sodium N-methyl-N-oleyltaurate), from GAF Corp.

11. Amphoteric Alkyl Carboxylates

Surfactants within this class are of the general formula described above, wherein:

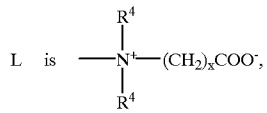

wherein R$^4$ is hydrogen, or an alkyl or alkylene carboxyl group of about 1 to 8 carbon atoms, optionally substituted in available positions by nitrogen, oxygen, or sulfur atoms, and x is 1 to 4; and wherein R is a branched or straight chain alkyl group of about 4 to 36 carbon atoms or an aralkyl group of about 7 to 36 carbon atoms which alkyl or aralkyl group is unsubstituted or independently substituted in available positions with oxygen, nitrogen or sulfur atoms.

Examples of preferred surfactants of this class are amphoteric propionates and alkyl and aryl betaines, optionally substituted with oxygen, nitrogen and/or sulfur atoms. Examples of commercially available surfactants of this class include "Tego™ Betain F-50" (coco-C(O)NH—CH$_2$CH$_2$CH$_2$-N$^+$(CH$_3$)$_2$—CH$_2$COO$^-$), from Goldschmidt Chemical Corp., "Mackam™OB-30 Amphoteric" (C$_{18}$H$_{34}$N$^+$(CH$_3$)$_2$CH$_2$COO$^-$), "Mackam™ HV Amphoteric" (C$_{18}$H$_{34}$C(O)NHCH$_2$CH$_2$CH$_2$N$^+$(CH$_3$)$_2$CH$_2$COO$^-$) from the McIntyre Group, Ltd., "Miranol 2CIB" from Rhone-Poulenc, Co., and "Miratane™ AP-C" (coco$_2$-N$^+$H—CH$_2$CH$_2$COO$^-$) from Rhone-Poulenc Co.

12. Alkyl phosphate mono or di-esters

Surfactants within this class are of the general formula described above, wherein:

R=R$^2$O(CH$_2$CH$_2$O)$_v$CH$_2$CH$_2$—, and wherein

R$^2$ is a branched or straight chain alkyl group of about 4 to 36 carbon atoms, preferably 8 to 22 carbon atoms, or an aralkyl group of about 7 to 36 carbon atoms, preferably 12 to 22 carbon atoms, optionally independently substituted in available positions with oxygen, nitrogen or sulfur atoms;

v is 0–100, preferably 0–20; and

L is PO$_4^{-2}$ or PO$_4^-$.

Examples of commercially available surfactants of this class include "Rhodafac™ MC-470" (ethoxylated dodecyl alcohol phosphate ester, sodium salt) from Rhone-Poulenc, and "Sipostat 0012" (C$_{12}$H$_{25}$OP(O) (O$^-$Na$^+$)$_2$ and "Sipostat 0018" (C$_{18}$H$_{37}$OP(O)(O$^-$Na$^+$)$_2$ from Specialty Industrial Products, Inc., Spartanburg, S.C.

Applicants have discovered that the above-described surfactants or mixtures of the above-described surfactants can be utilized in concentrations which are effective to provide adequate wetting and ensure a uniform coating while not significantly reducing the anti-fog or anti-reflective effects produced by the inorganic metal oxide/anionic silane coating. The anti-reflective property of the coating may be decreased by the surfactant by means similar to excess anionic silane, including reduction in the porosity and increase in the refractive index due to the refractive index of the surfactant itself. In general, an amount of surfactant is used which will ensure a uniform coating while not reducing either the anti-fog or anti-reflective properties. Surfactants of lower refractive indices may be tolerated at higher concentrations on a weight basis. For typical concentrations of metal oxide (e.g., about 1 to 5 percent by weight) most surfactants comprise less than about 0.1 percent by weight of the coating composition, preferably between about 0.003 and 0.05 percent by weight, in order to preserve the anti-reflective properties of the coating. It should be noted that with some surfactants a spotty coating is attained at concentrations in excess of what is needed to achieve the anti-fog property.

Where, however, the coating composition does not include one of the above-described surfactants or when improved coating uniformity is desirable, it may be beneficial to add another wetting agent, including those that do not impart durable anti-fog properties, in order to ensure uniform coating of the article from an aqueous or hydroalcoholic solution. Examples of useful wetting agents include polyethoxylated alkyl alcohols (e.g. "Brij 30," and "Brij 35," commercially available from ICI Americas, Inc., and "Tergitol™ TMN-6™ Specialty Surfactant," commercially available from Union Carbide Chemical and Plastics Co., polyethoxylated alkylphenols (e.g., "Triton™ X-100" from Union Carbide Chemical and Plastics Co., "Iconol NP-70" from BASF Corp.) and polyethylene glycol/polypropylene glycol block copolymer (commercially available as "Tetronic™ 1502 Block Copolymer Surfactant," "Tetronic™ 908 Block Copolymer Surfactant" and "Pluronic™ F38 Block Copolymer Surfactant," all from BASF, Corp.) Of course, any added wetting agent must be included at a level which will not destroy the anti-reflective or anti-fog properties of the coating. Generally the wetting agent is used in amounts of up to about 0.15 weight percent of the coating composition depending on the amount of inorganic metal oxide. Rinsing or steeping the coated article in water may be desirable to remove excess surfactant or wetting agent.

The coating composition may optionally contain a polymeric binder to improve scratch resistance and/or adhesion of the coating composition to the substrate. Useful polymeric binders are preferably water soluble or water swellable and include polymers comprised of ethenically unsaturated monomer(s), such as polyvinyl alcohol, poly-N-vinylpyrrolidone, polyvinyl acetate, polyacrylates and methacrylates and polyurethanes; polyesters; natural polymers such as starch, gelatin, gums, celluloses, dextran, proteins and the like; and derivatives (ionic and non-ionic) and copolymers based on any of the polymers listed above. Furthermore, polymers comprising alkoxysilane functionalities may also be useful. The coating composition can contain up to about 5 weight percent of the polymeric binder based on the weight of the inorganic metal oxide. Useful amounts of polymeric binder are generally in the range of about 0.05 to 5 weight percent by weight to improve scratch resistance and coating adhesion. Undesirable excess binder may be removed by rinsing or steeping the coated article in water.

It is also possible to apply a primer coating to improve adhesion of the coating to the substrate. A particularly preferred primer material is polyvinylidene chloride (PVDC).

Articles

Substrates to which the coating compositions of the invention can be applied are preferably transparent or translucent to visible light. Preferred substrates are made of polyester (e.g., polyethylene terephthalate, polybutyleneterephthalate), polycarbonate, allyldiglycolcarbonate, polyacrylates, such as polymethylmethacrylate, polystyrene, polysulfone, polyethersulfone, cellulose acetate butyrate, glass and the like, including blends and laminates thereof. Typically the substrate is in the form of a film, sheet, panel or pane of material and is part of an article such as ophthalmic lenses, architectural glazings, decorative glass frames, motor vehicle windows and windshields, and protective eye wear, such as surgical masks and face shields. The coatings may, optionally if desired, cover only a portion of the article, e.g., only the section immediately adjacent the eyes in a face shield may be coated. The substrate may be flat, curved or shaped. The article to be coated may be produced by blowing, casting, extrusion, or injection molding.

Articles such as disposable surgical face masks and face shields which are coated with the anti-reflective, anti-fog compositions of this invention are preferably stored in single use packages which reduce environmental exposure and contamination which can result in decreased anti-fog properties. Reusable articles are preferably used in combination with a package that protects or completely seals the product from environmental exposure when not in use. The material used to form the packages should be comprised of a non-contaminating material. It has been found that certain materials can result in partial or total elimination of the anti-fog properties. While not being bound by any theory, it is currently believed that materials which contain plasticizers, catalysts, and other low molecular weight materials which can volatilize on aging are sorbed into the coating and result in a decrease in the anti-fog property. For example, packaging materials such as polyurethane foams, plasticized polyvinylchloride and low density polyethylene have been found to significantly reduce the anti-fog properties of the articles of the present invention, especially when in direct contact with the coating. Currently preferred packaging materials include paper and bleached paper products, such as bleached white bond paper, cardboard, and clay-coated solid white bleached sulfate boxboard, and/or films or laminates made from polyester, high density polyethylene, or polystyrene.

Process

The compositions of the present invention are preferably coated on the article using conventional techniques, such as bar, roll, curtain, rotogravure, spray, or dip coating techniques. The preferred methods include bar and roll coating, or air knife coating to adjust thickness. In order to ensure uniform coating and wetting of the film, it is convenient to oxidize the substrate surface prior to coating using corona discharge or flame treatment methods. Other methods capable of increasing the surface energy of the article include the use of primers such as polyvinylidene chloride (PVDC). The coatings of the present invention are preferably applied in uniform average thicknesses varying by less than about 200 Å, and more preferably by less than 100 Å, in order to avoid visible color variations in the coating. The optimal average dry coating thickness is dependent upon the particular coating composition, but in general the average thickness of the coating is between 500 and 2500 Å, preferably 750 to 2000 Å, and more preferably 1000 to 1500 Å, as measured using an ellipsometer such as a Gaertner Scientific Corp Model No. L115C. Above and below this range, the anti-reflective properties of the coating may be significantly diminished. It should be noted, however, that while the average coating thickness is preferably uniform, the actual coating thickness can vary considerably from one particular point on the coating to another. Such variation in thickness, when correlated over a visibly distinct region, may actually be beneficial by contributing to the broad band anti-reflective properties of the coating.

The coatings of the present invention are preferably coated on both sides of the substrate. Alternatively, the coatings of the present invention may be coated on one side of the substrate. The opposite side of the substrate may be:

a. uncoated, b. coated with a conventional surfactant or polymeric anti-fogging composition such as that disclosed in U.S. Pat. Nos. 2,803,552; 3,075,228; 3,819,522; 4,467,073; or 4,944,294 (all of which are incorporated herein by reference), or c. coated with an anti-reflective composition, such as that disclosed in U.S. Pat. No. 4,816,333, or the multiple layered coating described by J. D. Masso in "Evaluation of Scratch Resistant and Anti-reflective Coatings for Plastic Lenses," (supra), both of which are incorporated herein by reference. Preferably, the antifog coating surface should face the direction of higher humidity, e.g., on a face shield the side having the anti-fog coating should face the wearer.

Once coated, the article is typically dried at temperatures of between 20 and 150° C. in a recirculating oven. The temperature may be increased further to speed the drying process, but care must be exercised to avoid degradation of the substrate. The preferred coating compositions are preferably dried at between 50 and 120° C. and most preferably between 100 and 110° C. After the coating composition is applied to the substrate and dried, the coating comprises preferably from about 60 to 95 percent by weight (more preferably from about 70 to 92 percent by weight) metal oxide, from about 5 to 35 percent by weight (more preferably from about 10 to 25 percent by weight) silane and optionally about 0 to 5 percent by weight (more preferably from about 0.5 to 2 percent by weight) surfactant, up to about 25 percent by weight (more preferably from about 5 to 15 percent by weight) coupling agent and up to about 5 percent by weight (preferably up to about 2 percent by weight) wetting agent.

When the coating compositions of the invention are applied to substrates to provide anti-reflection properties, glare is reduced by increasing the light transmission of the coated substrate. Preferably, the coated substrate exhibits an increase in transmission of normal incident light of at least 3 percentage points and up to as much as 10 percentage points or more, when compared to an uncoated substrate, at 550 mm (e.g., the wavelength at which the human eye displays peak photo-optic response). The percent transmission is dependent upon the angle of incidence and the wavelength of light and is determined using ASTM test method D1003-92, entitled "Haze and Luminous Transmittance of Transparent Plastics," incorporated herein by reference. Preferably, the coated substrates display an increase in percent transmission of greater than 3 percent, more preferably greater than 5 percent, and most preferably greater than 8 percent when compared with an uncoated substrate, using 550 nm light. When the desired usage involves significant "off-axis" (i.e. non-normal) viewing or unwanted reflections, gains in visibility may be greater especially where the reflections approach or exceed in brightness the object in view.

The coating compositions of the invention, as discussed hereinabove, provide anti-fog as well as anti-reflective properties to surfaces coated therewith. The anti-fog property is demonstrated by the tendency of the coatings to resist the formation of water droplets which tend to significantly reduce the transparency of the coated substrate. Water vapor from, for example, human breathing, tends to condense upon the coated substrate in the form of a thin uniform water film, rather than as water droplets. Such a uniform film does not significantly reduce the clarity or transparency of the substrate. For example, using the "Wetting Test" described in the Examples, when a 3 microliter drop of water is placed on the surface of a substrate coated with the coating composition of the invention, the drop spreads to an initial diameter of at least 6 mm, preferably at least 7 mm, and most preferably at least 8 mm.

The coating compositions of the present invention are durable and shelf stable, e.g., they do not deteriorate significantly when allowed to be exposed at 23° C. and 50% relative humidity for up to sixteen weeks. Preferred coatings when exposed at 30° C. and 60% relative humidity in a recirculated environmental chamber (recirculation rate=1.67 vol./min.) for at least 14 days, more preferably at least 21 days, and most preferably for at least 28 days, and tested according to the "Wetting Test" described in the Examples, have a 3 microliter drop diameter of at least 4 mm, and more preferably at least 5 mm.

EXAMPLES

Example 1 and Comparative Examples A and B

Preparation of Silane A

An organosilanolate-sulfobenzoic acid salt (Silane A) having the formula

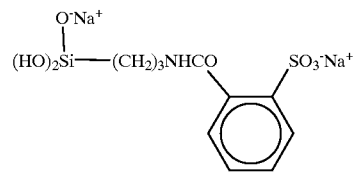

was prepared as follows. Ortho-sulfobenzoic acid cyclic anhydride (9.2 g), commercially available from Aldrich Chemical Co., Milwaukee, Wis., was added slowly to a 250 milliliter (ml) three neck glass flask containing a solution (pH 10.85) comprising 9.0 grams aminopropyltrimethoxysilane (APS), commercially available from Huls America, Inc., Piscataway, N.J., and 81.8 g deionized water. The pH was maintained at 10.0 to 10.5 by gradual addition of 30 g 2.5 N sodium hydroxide. Once the pH stabilized, the solution was stirred for 1 hour and the pH adjusted to 10.8 by the addition of more 2.5 N sodium hydroxide. The final silane concentration was 14 weight percent.

Preparation of Coating Compositions

The anti-fog/anti-reflective composition of Examples 1a and 1b were prepared by adding Silane A, prepared as described above, in the concentrations and amounts indicated in Table 1, and an anionic sulfosuccinate surfactant (commercially available as "Aerosol™ OT Surface Active Agent" from Cytec Industries, West Paterson, N.J.) as a 2 percent by weight dispersion in deionized water, to a dispersion containing 1.75 weight percent silica prepared by dilution of "Remasol SP-30 Sodium Stabilized Silica Sol" (supplied at 30 percent solution, particle size 70 Å, pH 10, commercially available from Remet Corp., Chadwicks, N.Y.) with deionized water. The compositions of Comparative Examples Aa and Ab were prepared by adding a cationic silane, N-trimethoxysilylpropyl-N,N,N-trimethylammonium chloride (commercially available as "T2925" from Huls America, Inc.) in the concentrations and amounts indicated in Table 1 and a 2 percent by weight dispersion of "Aerosol™ OT Surface Active Agent" in deionized water, to a 1.75 weight percent silica dispersion prepared by dilution of "Remasol SP-30" in deionized water. The composition of Comparative Example B was prepared by adding a non-ionic surfactant, polyethoxylated octylphenol (commercially available as "Triton™ X-100" from Union Carbide Chemical & Plastics Co., Danbury, Conn.) in the amount given in Table 1 to a 1.75 weight percent dispersion of "Remasol SP-301" in deionized water. Each composition was coated on corona discharge treated, 20 cm by 30 cm by 0.18 mm (7 mil) thick, polyethyleneterephthalate (PET) film using a roll coater with an air knife to adjust thickness of the dried coating to a purple to blue hue (color visualized by reflected light), approximately 1000 to 1200 Å. The coated film was immediately passed into a forced air drier at a temperature of 77° C. The dwell time in the oven was approximately 2 minutes. The coated films were cut to approximately 5 cm by 15 cm samples using caution to avoid contamination. The film samples were evaluated once for fogging the day they were made (Initial fog) and additional samples were withdrawn after aging (as described below) at intervals of 7, 14, 28, and 56 days. The film samples were placed vertically approximately 1 centimeter (cm) apart in a magazine prepared as a frame made of 0.6 cm thick papercovered polystyrene foam board with slits which held the samples. This magazine was placed in a totally recirculated (recirculation rate equals 1.67 volume per volume per minute) environmental chamber which was held at 30° C. and 60 percent relative humidity. Fogging was evaluated by holding individual film samples above a source of "steam" (water vapor) for approximately 2 to 3 seconds. The steam source was a beaker of boiling deionized water which was equipped with an inverted polypropylene funnel so that the "steam" was allowed to exit 10 cm to 13 cm above the liquid level through an opening which was approximately 1.3 cm in diameter. The "steam" temperature used was approximately 55° C. The results of initial fogging and fogging after aging were rated using the following scale: "0" means no fog, "1" means minimal slight haze, "2" means medium fog, and "3" means heavy fog or the same as an uncoated polyester film. The results are reported in Table 2.

TABLE 1

| Ex. No. | Silane | Silane Concentration (weight percent) | Surfactant | Surfactant Concentration (weight percent) |
|---|---|---|---|---|
| 1a | A (anionic) | 0.007 | "Aerosol ™ OT"[1] | 0.007 |
| 1b | A (anionic) | 0.100 | "Aerosol ™ OT"[1] | 0.007 |
| Comp. Aa | "T 2925" (cationic) | 0.007 | "Aerosol ™ OT"[1] | 0.007 |
| Comp. Ab | "T 2925" (cationic) | 0.175 | "Aerosol ™ OT"[1] | 0.007 |
| Comp. B | None | 0.000 | "Triton ™ X-100"[2] | 0.150 |

[1]an anionic sulfosuccinate surfactant
[2]anonionic surfactant

TABLE 2

| Ex. No. | Initial Fogging Value | Fogging Value after Aging | | | |
|---|---|---|---|---|---|
| | | Day 7 | Day 14 | Day 28 | Day 56 |
| 1a | 0 | 2 | 2 | 3 | 3 |
| 1b | 0 | 1 | 2 | 2 | 2 |
| Comp. Aa | 0 | 1 | 2 | 3 | 3 |
| Comp. Ab | 2 | 2 | 3 | 3 | 3 |
| Comp. B | 0 | 2 | 2 | 2 | 3 |

The coated film samples of Examples 1a and 1b and Comparative Examples Aa, Ab and B when visually compared to uncoated film and held up in front of a textrued beige surface were significantly more transparent and anti-reflective. The results of the fogging test indicated that at sufficient concentration of Silane A a durable anti-fog/anti-reflective film sample was produced. The anti-fog property of Example 1b was far superior to that of Comparative Examples Aa or Ab coated with a cationic silane and was superior to Comparative Example B coated with the nonionic surfactant "Triton™ X-100".

Examples 2 and 3 and Comparative Example C

Preparation of Silane B

An organosilanolate-sulfonic acid salt (Silane B) having the formula

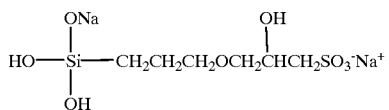

was prepared as follows. A solution comprising 20 g glycidoxypropyltrimethoxysilane (GPS) commercially available from Huls America, Inc., and 100 g of methanol was added slowly to a 1 liter flask containing 10.8 g sodium sulfite, commercially available from Aldrich Chemical Co., in 208 g deionized water. The reaction mixture was stirred as the temperature was increased to 50° C. and held at that temperature for 17 hours. The resulting solution was a very slight yellow color. The solution was diluted to 3 weight percent solids by the addition of 696 g of deionized water. The preparation of Silane B is described in Example 2 of U.S. Pat. No. 4,235,638, incorporated herein by reference.

Preparation of Coating Compositions

The anti-fog/anti-reflective compositions of Example 2 and the composition of Comparative Example C were prepared by adding a perfluoro-group substituted aliphatic anionic salt surfactant, commercially available as "Zonyl™ FSA Fluorosurfactant" from E.I. Du Pont de Nemours & Co., Wilmington, Del., to 50 g of a 1.75 weight percent silica prepared by dilution of "Remasol SP-30 Sodium Stabilized Silica Sol" (supplied as a 30 percent solution) in deionized water. The anti-fog/anti-reflective composition of Example 3 was prepared by adding Silane B and ethanol, in the amounts given in Table 3, to 50 g of a 1.75 weight percent dispersion of "Remasol SP-30 Sodium Stabilized Silica Sol" in deionized water. Each composition was coated on both sides of a 20 cm by 30 cm by 0.18 mm (7 mil) thick PET film by applying a bead of solution to one edge of the film and spreading it evenly across the surface using a number 6 Meyer bar. The coated films were dried in an oven at 110° C. for approximately 2 minutes. The films coated with the compositions of Comparative Example C and Example 2 were overcoated on both sides using the following compositions in the amounts given in Table 3. The overcoat composition for Comparative Example C was the perfluoro-group substituted aliphatic anionic salt surfactant, commercially available as "Zonyl™ FSA Fluorosurfactant". The overcoat composition for Example 2 was the perfluoro-group substituted aliphatic anionic salt surfactant commercially available as "Zonyl™ FSA Fluorosurfactant" mixed with Silane B. The overcoated films were dried in the same manner described above. The overcoated films were cut into 5 cm by 15 cm samples. The coated film samples were evaluated for fogging the day they were made (Initial fog) and after aging (as described below). The film samples were cut and placed approximately 1 centimeter (cm) apart in a magazine as described in Example 1 for aging. The magazine of samples was put into a paperboard box which was placed in a totally recirculated environmental chamber which was held at 30° C. and 60 percent relative humidity. Individual samples were removed after 7, 14, and 28 days and conditioned in a room held at 23° C. and 50 percent relative humidity for at least 8 hours before testing. Fogging was evaluated by the Wetting Test which follows. A 3 microliter drop of deionized water from an accurate syringe was gently placed on the surface of the coated sample by holding the syringe vertically and just touching the drop to the surface so that the drop did not fall and impact the surface. The drop was allowed to spread to its maximum extent. The diameter of the drop was determined by placing the sample over a paper printed with premeasured circles of varying diameters. The average of at least three drop diameters is recorded in Table 4.

TABLE 3

| | First coating composition: additions to the sol/water dispersion | | Overcoating composition: additions to water | |
|---|---|---|---|---|
| Ex. No. | Component | Amount (weight percent) | Component | Amount (weight percent) |
| Comp. C | "Zonyl ™ FSA" | 0.0075 | "Zonyl ™ FSA" | 0.0075 |
| 2 | "Zonyl ™ FSA" | 0.0075 | "Zonyl ™ FSA" | 0.0075 |
| | | | Silane B | 0.1750 |
| 3 | Silane B Ethanol | 0.1750 5.0 | None | |

TABLE 4

| | Wetting Value after Aging | | | |
|---|---|---|---|---|
| Example Number | Initial (mm) | Day 7 (mm) | Day 14 (mm) | Day 28 (mm) |
| Comp. C | 8.2 | 8.5 | 8.4 | 5.3 |
| 2 | 8.6 | 8.1 | 8.5 | 4.7 |
| 3 | 8.1 | 8.2 | 8.6 | 5.5 |

Fogging tests, such as those described in Example 1, established that wetting values below about 4.1 mm indicate that the coating will experience an unacceptable degree of fogging when used in surgical mask applications. For comparison, uncoated PET film has a wetting value of 2.75 mm. In general, the larger the drop diameter, the less actual fogging will occur. The films having the silane coating of the present invention produced coated films with acceptable wetting values (indicating no tendency to fog), even after aging in an accelerated aging environment for 28 days. When coated as a single coat, as in Example 3, or in a two-step process as in Example 2, the anionic silanes compared very favorably to the anionic fluorosurfactant used in Comparative Example C. Use of this anionic fluorosurfactant, "Zonyl™ FSA Fluorosurfactant", is described in commonly assigned copending U.S. patent application No. 08/354,242 (Attorney Docket No. 49053USA1D) filed on the same date as this application. The films of Comparative Example C and Example 2 had significant scratching due to the overcoating method. However, a coating process with less contact such as that used in Example 1 would be expected to yield a less-scratched product. The film samples of Examples 2 and 3 and Comparative Example C when visually compared to uncoated film and held up to a beige surface were significantly more transparent and anti-reflective.

Example 4

Preparation of Silane C

An organosilanolate-sulfonic acid salt (Silane C) having the formula

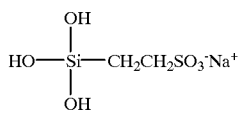

was prepared as follows. A solution of 16.7 g of triethoxyvinylsilane, commercially available from Aldrich Chemical Co., in 288 g anhydrous ethanol was slowly added dropwise to a stirred 3 neck, 1 liter nitrogen purged flask containing 20.0 g sodium bisulfite, 2.0 g sodium nitrate and 2.0 g sodium nitrite in 450 ml deionized water. The reaction mixture was allowed to stir at 23° C. for 3.5 days. The final product which was clear and transparent was filtered and stored in a sealed glass jar. The preparation of Silane C is described in Example 4 of U.S. Pat. No. 4,235,638, incorporated herein by reference.

Preparation of Compositions

The anti-fog/anti-reflective compositions of Examples 4a, 4b, 4c and 4d were prepared by adding Silane C and ethanol (in the amounts given in Table 5) to a dispersion containing 1.75 weight percent silica prepared by dilution of "Remasol SP-30 Sodium Stabilized Silica Sol" (supplied as a 30 percent solution) in deionized water.

TABLE 5

| | Components | | | |
|---|---|---|---|---|
| Example Number | Silica Sol (g) | Silane C (g) | Ethanol (g) | Distilled Water (g) |
| 4a | 2.92 | 4.38 | 2.50 | 40.21 |
| 4b | 2.92 | 6.56 | 2.50 | 40.52 |
| 4c | 2.92 | 8.75 | 2.50 | 38.33 |
| 4d | 2.92 | 10.94 | 2.50 | 36.14 |

Each composition was coated as described in Example 2 on both sides of a 0.1 mm (4 mil) thick PET film using a number 7 Meyer bar. The coated films were dried in an oven at 100° C. for approximately 2 minutes. The coated films were cut into 5 cm by 15 cm samples and aged as described in Example 2 and evaluated for fogging. Initial fog was recorded one day after coating and before placing the sample in the environmental chamber. One magazine of film samples was placed directly into the environmental chamber described in Example 1 ("exposed") and another magazine was enclosed in a paperboard box as described in Examples 2 and 3 ("packaged"). Fogging was evaluated using the Wetting Value (average drop diameter) described in Examples 2 and 3. The average of at least three drop diameters is recorded in Table 6 for the "exposed" samples and Table 7 for the "packaged" samples. The film samples of Examples 4a–4d when visually compared to uncoated film and held up to a beige surface were significantly more transparent and anti-reflective.

TABLE 6

| | "Exposed" Wetting Value after Aging | | | | | |
|---|---|---|---|---|---|---|
| Ex. No. | Initial (mm) | Day 14 (mm) | Day 21 (mm) | Day 28 (mm) | Day 42 (mm) | Day 56 (mm) |
| 4a | 8.2 | 3.8 | 3.6 | 3.6 | 3.6 | 3.6 |
| 4b | 8.4 | 4.1 | 4.9 | 4.5 | 4.1 | 4.0 |

TABLE 6-continued

"Exposed" Wetting Value after Aging

| Ex. No. | Initial (mm) | Day 14 (mm) | Day 21 (mm) | Day 28 (mm) | Day 42 (mm) | Day 56 (mm) |
|---|---|---|---|---|---|---|
| 4c | 9.1 | 8.2 | 5.7 | 7.1 | 6.8 | 5.3 |
| 4d | 10.3 | 7.1 | 7.3 | 8.1 | 7.7 | 8.2 |

TABLE 7

"Packaged" Wetting Value after Aging

| Ex. No. | Initial (mm) | Day 14 (mm) | Day 21 (mm) | Day 28 (mm) | Day 42 (mm) | Day 56 (mm) |
|---|---|---|---|---|---|---|
| 4a | 8.2 | 5.7 | 4.1 | 4.0 | 3.8 | 3.6 |
| 4b | 8.4 | 4.5 | 4.8 | 4.1 | 4.6 | 3.9 |
| 4c | 9.1 | 5.7 | 5.3 | 6.6 | 6.6 | 5.2 |
| 4d | 10.3 | 8.6 | 7.7 | 6.7 | 7.2 | 7.3 |

The results of Examples 4a to 4d indicate that compositions produced using Silane C have exceptional anti-fog/anti-reflective coatings. The wetting values indicate that increased concentrations of the anionic silane, and protecting the films by packaging during aging, aid in improving the anti-fog properties of the film. The coating quality of Examples 4a to 4c was very good. The coating quality of Example 4d was spotty but could be improved with the use of a wetting agent. The anti-fog property of the films of Examples 4b to 4d were durable out to 56 days even in the "exposed" conditions.

Example 5 and 6

Preparation of Silane D

An organosilanolate-carboxylic acid (Silane D) having the formula

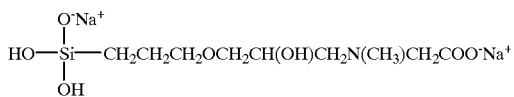

was prepared as follows. A solution (pH 6.5) comprising 8.9 g sarcosine, commercially available from Aldrich Chemical Company, Inc., 30 g methanol, and 70 g of deionized water in a 3 neck round bottom flask was agitated using a 1.2 centimeter (cm) magnetic stir bar. The pH was adjusted to 9.5 by adding 0.6 g sodium hydroxide. Glycidoxypropyltrimethoxysilane (GPS) (23.7 g), commercially available as "G6720" from Huls America, Inc., was added and the mixture was stirred at room temperature for 7 days.

Preparation of Coating Compositions

The anti-fog/anti-reflective compositions of Examples 5a, 5b, 5c, 5d and 5e were prepared by adding Silane D prepared as described above, in the amounts given in Table 8, to a dispersion containing 1.75 weight percent silica prepared by dilution of "Remasol SP-30 Sodium Stabilized Silica Sol" (supplied as a 30 percent solution) in deionized water. Next, ethanol was added very slowly to the stirred silane/sol solution as a wetting agent in the amounts indicated in Table 8. The total amount of composition was maintained at 50 g and the silica concentration of the sol was held constant at 1.75 weight percent by adjusting the amount of water.

TABLE 8

| | Components | | | |
|---|---|---|---|---|
| Example Number | Silica Sol (g) | Silane D (g) | Ethanol (g) | Distilled Water (g) |
| 5a | 2.92 | 0.55 | 2.50 | 44.03 |
| 5b | 2.92 | 0.73 | 2.50 | 43.85 |
| 5c | 2.92 | 0.91 | 2.50 | 43.67 |
| 5d | 2.92 | 1.09 | 2.50 | 43.49 |
| 5e | 2.92 | 1.28 | 2.50 | 43.30 |

Each composition was coated on a 20 cm by 30 cm by 0.18 mm (7 mil) thick flame-treated PET film by dispensing a bead of the composition from a pipet at one edge of one side of the film and spreading the bead across the entire surface to form a uniform coating using a number 7 Meyer bar. The coated films were dried in a recirculating oven at 100° C. for approximately 1 minute. The coating process was repeated for the second side of the film. The coating quality of the film samples was spotty in appearance despite the addition of ethanol as a wetting agent. Therefore, the coating compositions of Example 6a to 6e were prepared by adding 30 parts per million (ppm) of a wetting agent, commercially available as "Triton™ X-100," to each of the compositions listed in Table 8 in an attempt to improve coating quality. Films were coated with coating compositions 6a to 6e in the manner described above. The film samples were evaluated for anti-fog properties by: 1) breathing on the samples directly and evaluating the samples visually; and 2) cutting 5 cm by 7.5 cm samples while wearing cotton gloves, placing the samples in a magazine as described in Example 1, placing the magazine in a paperboard box as described in Examples 2 and 3, and placing the box in a recirculated oven having a recirculation rate of 1.67 volumes per minute at 30° C. and 60 percent relative humidity. The film samples were evaluated after aging in the oven (as described above) at 7, 14 and 21 days using the Wetting Test described in Examples 2 and 3. The average of at least three drop diameters is reported in Table 9.

TABLE 9

Wetting Value after Aging

| Ex. No. | Initial (mm) | Day 7 (mm) | Day 14 (mm) | Day 28 (mm) |
|---|---|---|---|---|
| 5a | 8.7 | 8.5 | 8.3 | 4.6 |
| 5b | 8.6 | 8.5 | 8.6 | 6.2 |
| 5c | 8.6 | 8.5 | 8.5 | 6.4 |
| 5d | 8.8 | 8.4 | 8.3 | 6.3 |
| 5e | 8.4 | 8.5 | 8.6 | 5.9 |
| 6a | 8.9 | 8.6 | 8.6 | 4.7 |
| 6b | 8.9 | 8.4 | 8.6 | 5.7 |
| 6c | 9.1 | 8.6 | 8.6 | 6.5 |
| 6d | 9.9 | 9.1 | 8.5 | 6.4 |
| 6e | 9.2 | 8.8 | 8.6 | 7.3 |

Examples 6a–6e had a good coating quality; that is, the coating had few defects. Once dried, a purple to blue hue was evident in every sample. The coated film samples of Examples 5a to 5e and 6a to 6e when visually compared to uncoated film and held up to a beige surface were more transparent and anti-reflective. None of the samples fogged in the direct breathing evaluation. All of the samples had wetting values in excess of 4.1 mm after 28 days in aging. The results indicate, however, that the increased level of silane in Examples 5c to 5e and examples 6c to 6e improved the durability.

Examples 7 and 8
Preparation of Silane E
An organosilanolate-phosphoric acid salt (Silane E) having the formula

was prepared as follows. A solution (pH 6.5) comprising 14.2 g anhydrous di-sodium hydrogen phosphate, 50 g methanol, and 125 g of deionized water in a 3 neck round bottom flask was agitated using a 1.2 centimeter (cm) magnetic stir bar and heated to 70° C. until the salt completely dissolved. Glycidoxypropyl-trimethoxysilane (GPS) (23.6 g), commercially available as "G6720" from Huls America, Inc., was added and the mixture was heated to 80° C. for 1.5 hours. Next, 1 g of solid sodium hydroxide was added and the mixture was heated and stirred for another 3.5 hours. Some precipitate was evident in the flask, but after cooling the mixture to room temperature and adding 100 g deionized water, a clear solution was formed. Several days later a small amount of precipitate formed, so the mixture was thoroughly shaken prior to use.

Preparation of Coating Compositions

The anti-fog/anti-reflective compositions of Examples 7a, 7b, 7c, 7d and 7e were prepared by adding Silane E to a 1.75 weight percent dispersion of "Remasol SP-30 Sodium Stabilized Silica Sol" (supplied as a 30 percent solution) in deionized water, in the amounts given in Table 10. Next, ethanol was added very slowly to the stirred silane/sol solution as a wetting agent in the amounts indicated in Table 10. The total amount of composition was maintained at 50 g and the silica concentration of the sol was held constant at 1.75 weight percent by adjusting the amount of distilled water.

TABLE 10

| | Components | | | |
|---|---|---|---|---|
| Example Number | Silica Sol (g) | Silane E (g) | Ethanol (g) | Distilled Water (g) |
| 7a | 2.92 | 1.09 | 2.50 | 43.49 |
| 7b | 2.92 | 1.46 | 2.50 | 43.12 |
| 7c | 2.92 | 1.82 | 2.50 | 42.76 |
| 7d | 2.92 | 2.19 | 2.50 | 42.39 |
| 7e | 2.92 | 2.55 | 2.50 | 42.03 |

Each composition was coated by hand on both sides of a 20×30 cm, 0.18 cm (7 mil) thick flame treated PET film and dried as described in Examples 5 and 6. As in Example 4, the coating quality of the film samples of Examples 7a–7e were spotty in appearance despite the addition of ethanol as a wetting agent. Therefore, Examples 8a–8e were prepared by adding 30 parts per million (ppm) of a wetting agent commercially available as "Triton™ X-100" to each of the compositions listed in Table 11 to improve coating quality. The film samples were evaluated for anti-fog properties as described in Examples 5 and 6.

TABLE 11

| | Wetting Value after Aging | | | |
|---|---|---|---|---|
| Example Number | Initial (mm) | Day 7 (mm) | Day 14 (mm) | Day 28 (mm) |
| 7a | 8.6 | 8.2 | 6.4 | 4.2 |
| 7b | 8.6 | 7.9 | 5.9 | 4.4 |
| 7c | 9.1 | 7.7 | 5.9 | 4.4 |
| 7d | 8.8 | 6.2 | 4.8 | 4.1 |
| 7e | 9.0 | 6.4 | 4.8 | 4.1 |
| 8a | 9.4 | 7.8 | 6.7 | 4.4 |
| 8b | 9.7 | 8.5 | 7.2 | 4.6 |
| 8c | 9.4 | 7.8 | 6.9 | 4.6 |
| 8d | 9.1 | 7.6 | 6.6 | 4.7 |
| 8e | 8.9 | 7.9 | 6.9 | 4.7 |

The films of Examples 8a–8e had a good coating quality; that is, the coating had few defects. A purple to blue hue was evident in every sample. The coated film samples of Examples 7a–7e and 8a–8e when visually compared to uncoated film and held up in front of a beige surface were significantly more transparent and anti-reflective. Examples 8a to 8e and Examples 7a to 7c did not fog in the direct breathing evaluation. However, Example 7d had a very slight amount of fog and Example 7e showed only minor fogging in the direct breathing evaluation. All of the samples had wetting values of 4.1 mm or greater after 28 days in aging.

We claim:

1. An article comprising a substrate having at least one surface coated with a porous inorganic metal oxide network in contact with a silane, or a siloxane oligomer which is formed by the partial or complete hydrolysis and condensation of said silane, wherein said silane or siloxane oligomer comprises at least one hydrophilic anionic group selected from the group consisting of $-OSO_2O^-$, $-SO_2O^-$, $CO_2^-$, $(-O)_2P(O)O^-$; $-P(O)(O^-)_2$, $-OP(O)(O^-)_2$, $-P(O^-)_2$, and $-OP(O^-)_2$.

2. The article according to claim 1 wherein the surface is plastic or glass.

3. The article according to claim 1 wherein the substrate is transparent or translucent to visible light incident thereon.

4. The article according to claim 1 wherein the substrate is selected from the group consisting of polyester, polycarbonate, allyldiglycolcarbonate, polyacrylates, polystyrene, polysulfone, polyethersulfone, cellulose acetate butyrate, glass, blends and laminates thereof.

5. The article according to claim 1 wherein the porous inorganic metal oxide network has a uniform average thickness.

* * * * *